G. R. COULS.
PLANT WATERING DEVICE.
APPLICATION FILED JULY 19, 1911.

1,029,107.

Patented June 11, 1912.

WITNESSES:
H. Barnes
E. Peterson

INVENTOR:
George R. Couls
BY
Pierre Barnes
ATTORNEY

UNITED STATES PATENT OFFICE.

GEORGE R. COULS, OF TACOMA, WASHINGTON.

PLANT-WATERING DEVICE.

1,029,107.  Specification of Letters Patent.  Patented June 11, 1912.

Application filed July 19, 1911. Serial No. 639,342.

*To all whom it may concern:*

Be it known that I, GEORGE R. COULS, a citizen of the United States, residing at Tacoma, in the county of Pierce and State of Washington, have invented certain new and useful Improvements in Plant-Watering Devices, of which the following is a specification.

This invention relates to agricultural appliances; and its object is to provide improved means for supplying water to the roots of plants or trees and is especially intended for use in those sections of the country where there is a scarcity of water.

With this end in view, the invention consists in the provision of a water receptacle which is placed in the ground in proximity to the plant and from which water is gradually delivered to afford nourishment to the plant.

The invention further consists in the novel construction and adaptation of devices, as will be hereinafter described and claimed.

Figure 1:
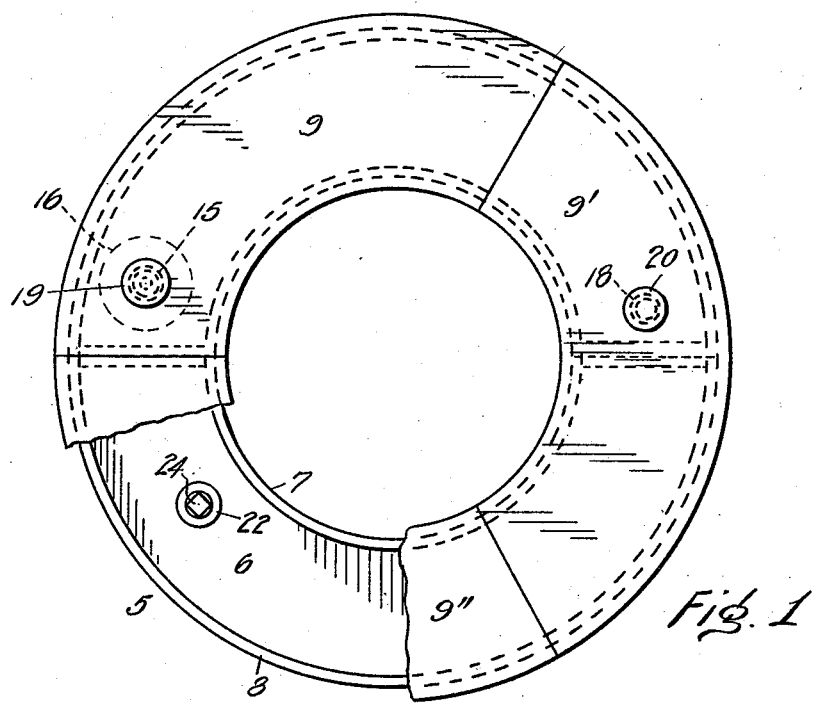
Figure 2:
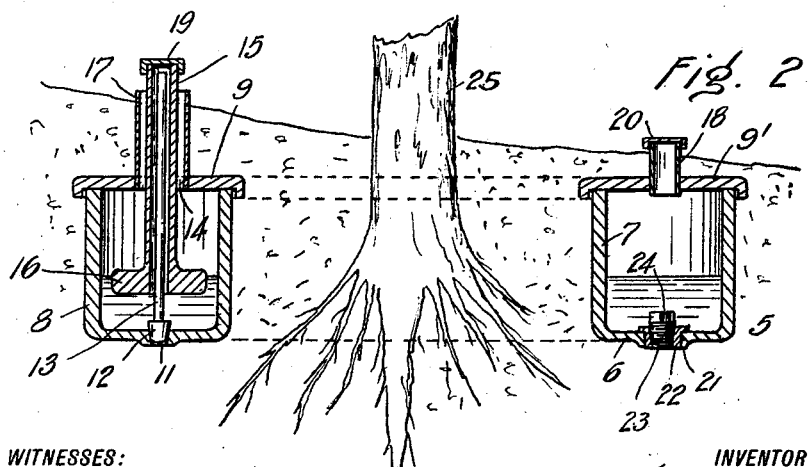

In the accompanying drawings, forming part of this specification, Figure 1 is a plan view of an embodiment of my invention, and with one of the cover sections partly broken away. Fig. 2 is a vertical cross sectional view of the same in operative position in the ground.

According to my invention, I provide a vessel 5 of a substantially annular configuration in horizontal section and it may be made in one or more sections. When it is to be installed in the ground about a growing tree, for example, the vessel is most conveniently made in two sections. Said vessel is composed of a bottom 6, an inner wall 7 and an outer wall 8. For the top of the vessel, there is provided a removable cover which is formed of a plurality of sections as 9, 9' and 9''. In said bottom is a hole 11 through which any dirt or sedimentary matter may, upon occasion, be drained from the vessel chamber. 12 represents a stopper for said hole and, as illustrated, is provided with a rod 13. In the cover section 9 above said hole and in alinement with the latter is an opening 14 through which extends the tubular stem 15 of a flotative body 16. To prevent the soil from falling against the stem 15 and also to protect the opening 14, a casing-tube 17 (Fig. 2) is advantageously employed to inclose the float-stem. For supplying water to the vessel, a tube 18 extends through a cover section and to a distance thereabove. Detachable caps 19 and 20 are provided respectively for the float-stem and the tube 18. In the bottom of the vessel is a number of holes, such as 21, each of which is provided with a bush 22 having a screw threaded tapering hole 23 therein. Provided for each of the bush holes 23 is a tapering screw threaded plug 24 and by unscrewing these plugs to various amounts openings are provided thereabout by reason of tapering configuration of the holes 23 and of the plugs for the discharge of the water from the vessel.

For operation, the vessel is buried in the ground to surround a plant as the tree 25, and preferably to a depth to have the tubes 17 and 18 extend above the ground surface. Water is then supplied through the tube 18 to a selected amount, as will be indicated by the elevation of the stem 15 of the water-borne float 16, while the displaced air will escape through the tube 17. The water will escape through the aforementioned bushings to commingle with the soil and thence is delivered with soluble plant-foods to the plant. When the water level within the vessel approaches the bottom thereof, the rod 13, which extends into the stem 15, will be encountered by the cap 19 in descending with the supporting stem and the connected float and the cap will be thereby thrust off to indicate to an attendant the exhaustion of the water.

By suitably mulshing the ground surface above a buried water container, the evaporation is minimized and a supply of water will be maintained for a relatively long period.

The invention is extremely simple, but is valuable to farmers where water is a desideration.

What I claim as my invention, is—

In a device of the class described, an annular water container provided in the bottom with an outlet opening, a tapering plug for controlling the discharge through said opening, said bottom further provided with a drain opening, a cover for said container formed of a plurality of sections, one of said cover sections provided with a water inlet, a float within the receptacle having a hollow stem projecting through one of the cover sections, a valve rod extending through the float and stem and having a valve normally closing said drain opening, and a casing-tube surrounding the stem and in which the latter is freely movable.

GEORGE R. COULS.

Witnesses:
H. BARNES,
E. PETERSON.

Copies of this patent may be obtained for five cents each, by addressing the "Commissioner of Patents, Washington, D. C."